US010607168B2

(12) United States Patent
Cunico et al.

(10) Patent No.: US 10,607,168 B2
(45) Date of Patent: *Mar. 31, 2020

(54) DISCOVERY AND COMMUNICATION OF TEAM DYNAMICS

(71) Applicant: International Business Machines Corporation, Armonk, NY (US)

(72) Inventors: Hernan A. Cunico, Holly Springs, NC (US); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 15/185,295

(22) Filed: Jun. 17, 2016

(65) Prior Publication Data
US 2017/0032294 A1    Feb. 2, 2017

Related U.S. Application Data

(63) Continuation of application No. 14/812,453, filed on Jul. 29, 2015.

(51) Int. Cl.
*G06Q 10/06* (2012.01)
*H04L 29/08* (2006.01)
(Continued)

(52) U.S. Cl.
CPC .  *G06Q 10/063114* (2013.01); *G06Q 10/0631* (2013.01); *H04L 43/0876* (2013.01);
(Continued)

(58) Field of Classification Search
None
See application file for complete search history.

(56) References Cited

U.S. PATENT DOCUMENTS 7,688,196 B2   3/2010 Hannah
7,974,849 B1 *  7/2011 Begole ............... G06Q 10/0631
                                                                705/1.1
(Continued)

FOREIGN PATENT DOCUMENTS

WO         0250722 A2     6/2002
WO    WO-2004008683 A2 *  1/2004    ........... H04L 63/062

OTHER PUBLICATIONS

Definition of "programmatic" retrieved from [URL: https://www.dictionary.com] on Sep. 29, 2018.*
(Continued)

*Primary Examiner* — Susanna M. Diaz
(74) *Attorney, Agent, or Firm* — Cuenot, Forsythe & Kim, LLC

(57) ABSTRACT

Electronic communications of team members of a team are monitored over time. Individual repeating patterns of interactions between team members and associated repeating subject matter topics of the interactions are identified. The identified individual repeating patterns and the associated repeating subject matter topics of the interactions are aggregated into a set of group interaction patterns of the team. Routine availability of a team member for additional interactions is determined in accordance with the set of group interaction patterns of the team.

7 Claims, 5 Drawing Sheets

(51) Int. Cl.
*H04L 12/58* (2006.01)
*H04W 4/08* (2009.01)
*H04L 12/26* (2006.01)

(52) U.S. Cl.
CPC .............. *H04L 51/32* (2013.01); *H04L 67/22* (2013.01); *H04W 4/08* (2013.01)

(56) References Cited

U.S. PATENT DOCUMENTS

| | | | | |
|---|---|---|---|---|
| 8,898,098 | B1* | 11/2014 | Luechtefeld | G06Q 10/10 704/257 |
| 2004/0210658 | A1* | 10/2004 | Guillermo | G06F 3/0481 709/227 |
| 2005/0050158 | A1* | 3/2005 | Solari | G06Q 10/10 709/217 |
| 2005/0091369 | A1* | 4/2005 | Jones | H04L 41/06 709/224 |
| 2008/0189407 | A1 | 8/2008 | Charlton et al. | |
| 2009/0043621 | A1 | 2/2009 | Kershaw | |
| 2009/0144102 | A1* | 6/2009 | Lopez | G06F 21/552 705/7.11 |
| 2010/0325107 | A1 | 12/2010 | Kenton et al. | |
| 2011/0213211 | A1 | 9/2011 | Stevens | |
| 2012/0151047 | A1* | 6/2012 | Hodges | G06F 21/604 709/224 |
| 2013/0054706 | A1* | 2/2013 | Graham | H04M 19/04 709/206 |
| 2013/0096970 | A1 | 4/2013 | Boss et al. | |
| 2013/0218947 | A1* | 8/2013 | Zur | G06Q 10/06 709/203 |
| 2013/0297536 | A1* | 11/2013 | Almosni | G16H 50/20 706/12 |
| 2013/0311387 | A1* | 11/2013 | Schmerler | G06Q 30/018 705/317 |
| 2014/0164537 | A1* | 6/2014 | Bank | H04L 51/04 709/206 |
| 2014/0280553 | A1* | 9/2014 | Hernandez | H04L 67/22 709/204 |
| 2014/0368538 | A1* | 12/2014 | Ratcliff | G06Q 50/10 345/633 |
| 2015/0262132 | A1* | 9/2015 | Miller | G06Q 10/1097 705/7.15 |
| 2016/0026939 | A1* | 1/2016 | Schiffer | G06F 17/24 705/7.11 |
| 2016/0224925 | A1* | 8/2016 | Schulz | G06Q 10/06398 |
| 2017/0032308 | A1 | 2/2017 | Cunico et al. | |

OTHER PUBLICATIONS

IBM, List of IBM Patents or Patent Applications Treated as Related, Applicant Appendix, Jun. 17, 2016, pp. 1-2, the contents of which are incorporated herein by reference in their entirety.

United States Patent and Trademark Office, Office Action for U.S. Appl. No. 14/812,453, dated Mar. 8, 2018, pp. 1-24, Alexandria, VA, USA.

IBM, List of IBM Patents or Patent Applications Treated as Related, Applicant Appendix, Jun. 7, 2018, pp. 1-2, the contents of which are incorporated herein by reference in their entirety.

United States Patent and Trademark Office, Office Action for U.S. Appl. No. 14/812,453, dated Jun. 28, 2018, pp. 1-33, Alexandria, VA, USA.

United States Patent and Trademark Office, Advisory Action for U.S. Appl. No. 14/812,453, dated Sep. 5, 2018, pp. 1-5, Alexandria, VA, USA.

United States Patent and Trademark Office, Office Action for U.S. Appl. No. 14/812,453, dated Oct. 4, 2018, pp. 1-36, Alexandria, VA, USA.

United States Patent and Trademark Office, Office Action for U.S. Appl. No. 14/812,453, dated Apr. 26, 2019, pp. 1-17, Alexandria, VA, USA.

United States Patent and Trademark Office, Advisory Action for U.S. Appl. No. 14/812,453, dated Jul. 10, 2019, pp. 1-5, Alexandria, VA, USA.

\* cited by examiner

DISCOVERY AND COMMUNICATION OF TEAM DYNAMICS

BACKGROUND

The present invention relates to evaluation of electronic communications. More particularly, the present invention relates to discovery and communication of team dynamics.

Users of computing devices may communicate with one another by sending messages to one another using different messaging technologies. For example, users may send electronic mail messages ("emails") or may send text messages to communicate with one another.

SUMMARY

A computer-implemented method includes monitoring electronic communications of team members of a team over time; identifying individual repeating patterns of interactions between team members and associated repeating subject matter topics of the interactions; aggregating the identified individual repeating patterns and the associated repeating subject matter topics of the interactions into a set of group interaction patterns of the team; and determining routine availability of a team member for additional interactions in accordance with the set of group interaction patterns of the team.

A system that performs the method and a computer program product that causes a computer to perform the method are also described.

DETAILED DESCRIPTION

Figure 1:
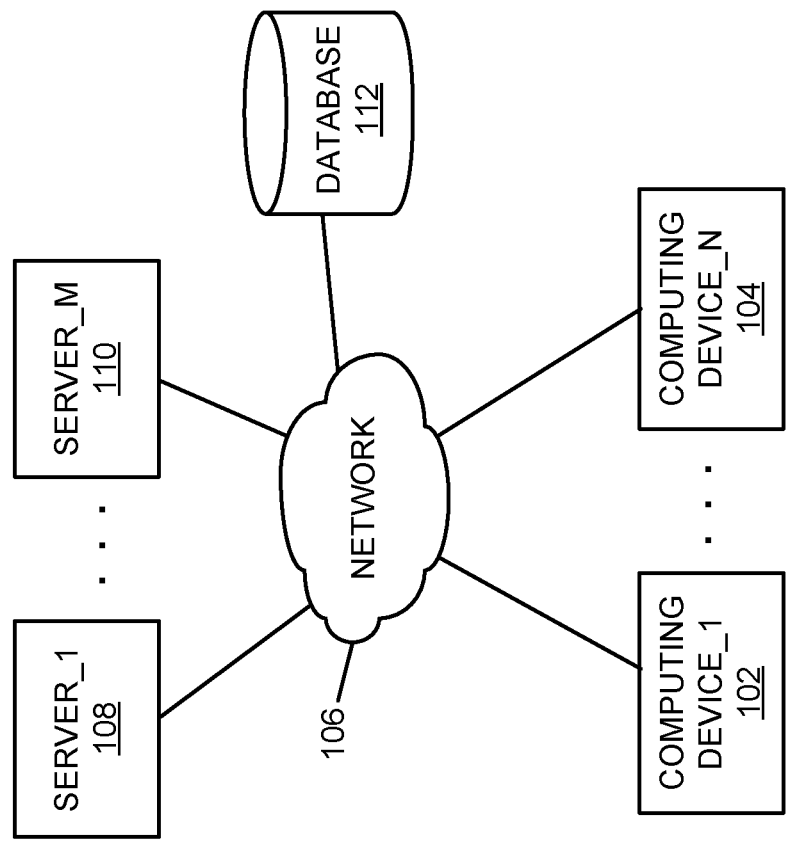
FIG. 1 is a block diagram of an example of an implementation of a system for discovery and communication of team dynamics according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides discovery and communication of team dynamics. The present technology solves a recognized team dynamics discovery problem by providing technology that includes a new form of electronic messaging analysis that provides computational processing to discover interaction dynamics of team members, such as at work or within recreational settings, within complex electronic communication environments. The technology described herein automatically analyzes a team's interaction dynamics by aggregating analysis of individual team members' characteristics and routines.

The technology described herein operates by monitoring electronic communications of team members of a team over time. Individual repeating patterns of interactions between team members and associated repeating subject matter topics of the interactions are identified, and aggregated into a set of group interaction patterns of the team. Usual/routine availability of a team member for additional interactions in accordance with the set of group interaction patterns of the team is determined.

By use of the technology described herein, persons seeking to join and/or contribute to an organization (e.g., a job applicant, a member of another team, etc.) may determine information regarding the team dynamics of that organization prior to joining and/or participating with the respective organization. For example, the person may be advised that there are particular days that the team regularly works longer hours, that the whole team goes out for lunch together on Thursdays, that 80% of the team's meetings happen in the mornings, that 60% of the team works remotely (e.g., little chance to interact during work hours with certain members), that there is a particular management style for the team, and/or that the team members participate in particular activities outside of work. Many examples/types of team dynamics information, and additional types of information, may be provided to a person that is interested in joining and/or contributing to a group/team, and all such types of information are considered within the scope of the present subject matter.

With the provided information about the team's dynamics and culture, the applicant may be able to determine whether he/she is interested in joining that particular team. For example, with respect to a candidate that is considering joining an organization, the candidate may determine that team members of a global organization that designs and manufactures products may communicate daily with colleagues located in different countries (e.g., manufacturing partners, suppliers, etc.). These interactions may routinely occur outside of normal working hours due to time differences between the respective facilities where the team members participate in product development. By knowing the team dynamics and interactions of the global organization (e.g., unusual working hours) and determining whether those dynamics are compatible with their own available work hours, the candidate may be able to make better decisions with respect to joining this organization.

The system learns user behavior and the expertise of each of the individuals of the team and analyzes their mutual interactions. Individual patterns may be aggregated into group patterns, and the group patterns may be made available to the new/prospective team member. Further, scheduled or planned activities may deviate from original planned arrangements. The technology described herein monitors actual interactions rather than planned interactions to derive a more accurate set of patterns than would otherwise be possible.

The technology described herein monitors and learns the types of electronic communication interactions and the timing of the electronic communication interactions between team members by performing a set of programmatic tasks. Natural language processing (NLP) and semantic analysis may be used to derive a higher-level of understanding of team member one-on-one communications. Additionally, analysis of email and messaging exchanges, meetings (content and level of involvement), timing, and other aspects of interactions may be used to derive patterns of interactions. For example, topics being discussed and the timing of the discussions may be extracted. A high level pattern of each team member may be created that shows when the member is usually in meetings, the member's working schedule, the member's area of expertise, and other factors. Further, communication and working patterns between individuals may be derived. These individual patterns may be aggregated and extrapolated to the entire team to derive the team's collective dynamics. The information may be made available to the new/prospective team member. As such, the present technology analyzes and extrapolates calendar schedules, email messaging, instant messaging, and other ways of formal and informal communication, to summarize the team dynamics within a domain of recruiting, acquiring, and retaining talent.

It should be noted that the information derived as described herein from electronic communications represents a new form of information derived by technical analysis of communication patterns of the respective team members. The electronic communications include instant messaging, teleconference communications, web-conference communications, electronic mail messaging, and other forms of electronic communications as appropriate for a given implementation.

To carry out the monitoring and analysis, an activity monitoring agent may be installed on each team member's computer and smart devices. The activity monitoring agent may analyze user email, instant messaging activity, meeting content, as well as regularly used applications (content from those applications may be analyzed). Using NLP and semantic analysis, key focus areas for each individual user may be extracted and derived. This form of analysis may further be extended to analysis of discussions by telephone and network technology-based discussions (e.g., Voice over Internet Protocol (VOIP)). The activity monitoring agent may be configured to safeguard privacy concerns by allowing the individual user to edit and refine the identified focus areas to ensure the user is accurately represented within the aggregated pattern analysis.

Using this information, the activity monitoring agent may associate the individual user with an area of expertise or high involvement. The activity monitoring agent may also analyze and determine when the user is having meetings and/or engaged in regular instant messaging conversations. The activity monitoring agent may then extract focus area, timing, and other information that identifies other individuals involved in the discussions/meetings, and may create a map that links the respective individuals, their respective focus areas, and the patterns of timing of their respective interactions. The activity monitoring agent may then pass the derived user information to a central team dynamics aggregation system that aggregates the details associated with any individual team member with details derived for all other team members. Information about the individual users may be dynamically updated as user responsibilities and patterns change within the same team over time. The central team dynamics aggregation system may implement cross-checks of the information about the team members and their interactions, and may use confidence levels to either confirm or adjust the activity monitoring agent's results.

With all of the information aggregated and revised over time, the central team dynamics aggregation system may make this information available to the team as a team interaction matrix that lists the individuals with their associated expertise and/or areas of heavy involvement, the relationship between the members, and the timing and topics of regular meetings and conversations. This team interaction matrix may be useful to new/prospective team members, and may also be useful to any other external team that is interested in interacting with members of this particular team for which team dynamics have been derived.

There are many possible techniques by which to graphically represent team dynamics as well as patterns of individual team members within a team interaction matrix, and all such possibilities are considered within the scope of the present subject matter. As an example, one possible representation of a team interaction matrix is provided below after certain introductory drawings are described.

It should be noted that conception of the present subject matter resulted from recognition of certain limitations associated with discovery of team dynamics within complex communication environments. For example, it was observed that the types of interactions and timing of interactions among team members, whether during work or recreation, is difficult to determine because people have begun to interact more by use of electronic communications rather than in a face-to-face manner. It was further observed that two fundamental problems exist as a result of the lack of information caused by the increased use of electronic communications. As a first problem, it was observed that when a new person joins a team (e.g., by being hired, or moving from one department to another department), the new person usually relies upon another person within the team to get them "up to speed" with the dynamics of that team. However, it was determined that a problem exists because the other person that knows the operations, procedures, personnel, and other aspects associated with the team is not always available, which results in a productivity loss for the new team member. As a second problem, it was observed that if a person is, for example, evaluating whether to join a team or apply for a new job in a different organization, the person would want to know as much as possible about the team prior to making a decision so they will know if they and the organization are a good fit for one another. However, it was determined that conventional technologies do not provide information about team dynamics. It was further determined that new technology that analyzes electronic communications to discover the team dynamics and culture of an organization, and that makes the discovered team dynamics and culture of the organization available to a potential new team member may be useful to attract new candidates for the team and may further increase productivity of new team members. The present subject matter improves team analytics and productivity by providing for increased information about team dynamics, as described above and in more detail below.

The discovery and communication of team dynamics described herein may be performed in real time to allow prompt discovery and communication of team dynamics. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for discovery and communication of team dynamics. A computing device_1 102 through a computing device_N 104 communicate via a network 106 with several other devices. The other devices include a server_1 108 through a server_M 110, and a database 112.

As will be described in more detail below in association with FIG. 2 through FIG. 5, one or more of the server_1 108 through the server_M 110 in combination with the computing device_1 102 through the computing device_N 104 may each provide automated discovery and communication of team dynamics. The automated discovery and communication of team dynamics is based upon monitoring and analysis of electronic communications of team members over time, and discovery of interaction patterns among team members. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The computing device_1 102 through the computing device_N 104 represent user communications devices. As such, the computing device_1 102 through the computing device_N 104 may include any device usable by a team member to communicate with another team member.

The server_1 108 through the server_M 110 may include any device capable of serving and monitoring electronic communication messages generated by a device, such as the computing device_1 102 through the computing device_N 104, via a network, such as the network 106. As such, the server_1 108 through the server_M 110 may each include a web server, application server, or other data server device, and may also include technology-specific server devices that provide messaging infrastructure to facilitate electronic messaging between team members.

The database 112 may include a relational database, an object database, or any other storage type of device. As such, the database 112 may be implemented as appropriate for a given implementation. The database may be used to store and publish team dynamics information, such as team interaction matrices and other information as appropriate for a given implementation.

Figure 2:
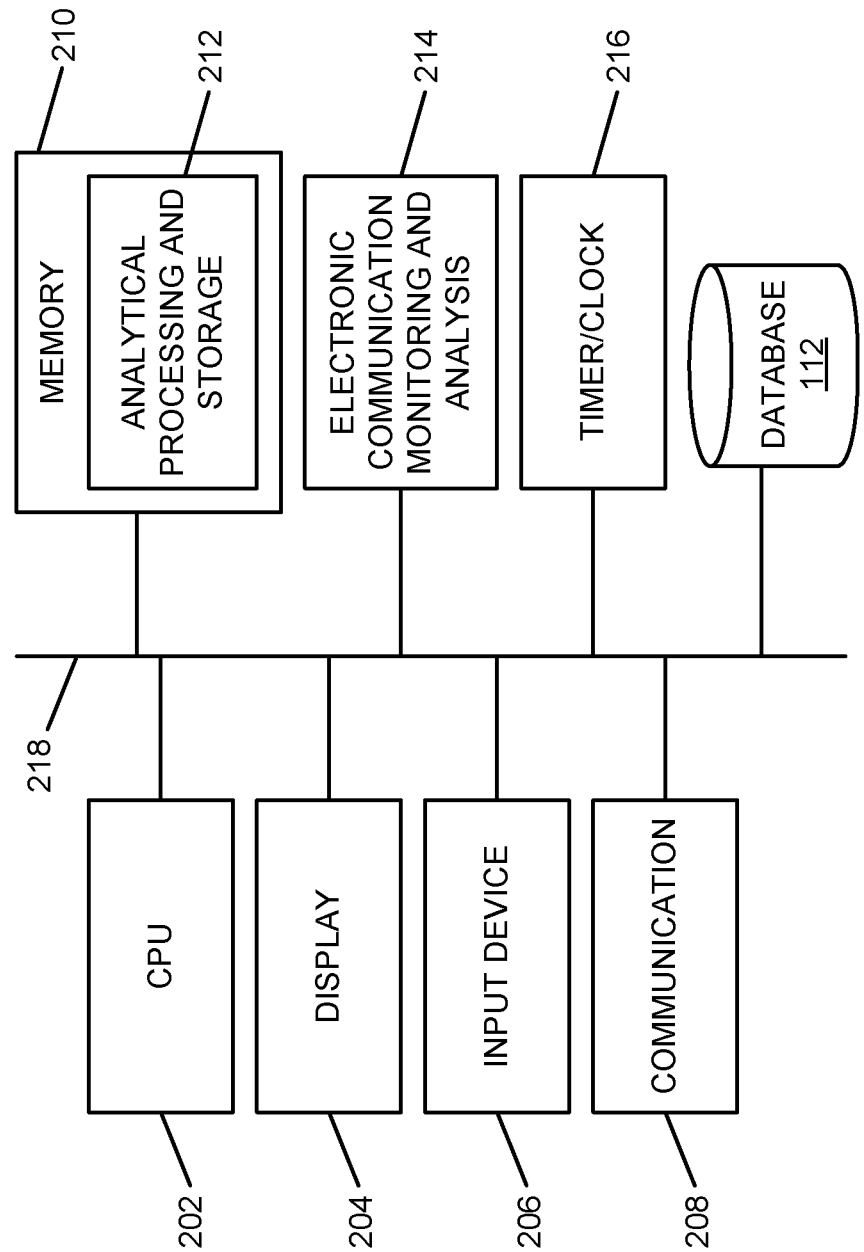
FIG. 2 is a block diagram of an example of an implementation of a core processing module capable of performing discovery and communication of team dynamics according to an embodiment of the present subject matter.

FIG. 2 is a block diagram of an example of an implementation of a core processing module 200 capable of performing discovery and communication of team dynamics. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of discovery and communication of team dynamics in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes an analytical processing and storage area 212 that provides processing and storage of information discovered from analysis of electronic communications of team members within the core processing module 200. It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An electronic communication monitoring and analysis module 214 is also illustrated. The electronic communication monitoring and analysis module 214 provides natural language processing (NLP), semantic analysis, and other processing for the core processing module 200, as described above and in more detail below. The electronic communication monitoring and analysis module 214 implements the automated discovery and communication of team dynamics of the core processing module 200.

It should also be noted that the electronic communication monitoring and analysis module 214 may form a portion of other circuitry described without departure from the scope of the present subject matter. The electronic communication monitoring and analysis module 214 may form a portion of an interrupt service routine (ISR), a portion of an operating system, or a portion of an application without departure from the scope of the present subject matter. The electronic communication monitoring and analysis module 214 may also be implemented as an embedded device with circuitry designed specifically to perform the processing described herein as appropriate for a given implementation.

A timer/clock module 216 is illustrated and used to determine timing and date information, such as timing of team member electronic communications/interactions, as described above and in more detail below. As such, the electronic communication monitoring and analysis module 214 may utilize information derived from the timer/clock module 216 for information processing activities, such as the discovery and communication of team dynamics described herein.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the electronic communication monitoring and analysis module 214, the timer/clock module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

With the execution platform technology described above, further description of types of information that may be provided within the team interaction matrix will be described. This information may be organized and presented in any combination or arrangement suitable for a given implementation. Table (1) below shows example information that may be programmatically collected by analysis of user electronic communications and aggregated into an team interaction matrix. Any column may be considered an entry point for a new user looking for specific technical assistance in a particular focus area or for a new potential employee trying to determine working compatibility (e.g., available/preferred times for interaction, etc.) with the team represented within the Table (1).

TABLE (1)

Example Team Interaction Matrix

| Name | Focus Area | Availability | Meetings and Other Unavailable Times |
|---|---|---|---|
| Lisa | Installation | M, T 9AM-6PM Instant Messaging W, H, F 9AM-4PM | Works remotely on Wednesdays, Thursdays, and Fridays |
| Peter | Infrastructure and Builds | T, H 2PM-4PM | Infrastructure Web-conference Tuesday 9:00AM-11:00AM Build Web-conference Thursday 9:00AM-11:00AM Routinely responds to emails daily between 4:00PM-5:00PM |
| Cathy | Team Lead | M, T, W, H, F 9AM-10AM, 10:30AM-11AM, 12PM-6PM | Follow up communications with Peter at 10AM every day via instant messaging on build status Team status call Tuesdays 11AM-12PM Web-conference with Jane Wednesdays from 11AM to 12PM to report project status |
|  | System Configuration |  | Follow up with Derek at 4:30PM every day via instant messaging on quality assurance (QA) status |
| John | Liaison with Support Operations | M, W, F 7AM-1PM | Support teleconference Tuesday and Thursday 2:00PM to 4:30PM Operations web-conference Monday and Wednesday 2:00PM to 4:00PM |
| ... | ... | ... | ... |

As can be seen from Table (1) above, a team member "Lisa" is generally available on Monday and Tuesday (e.g., "M, T") between nine o'clock ante meridiem and six o'clock post meridiem (9 AM-6 PM) in the office, but works remotely with instant messaging, which has been determined based upon her remote communication routines to be her preferred mode of communication on Wednesdays, Thursdays, and Fridays (e.g., "W, H, F") at the times listed within Table (1) (e.g., 9 AM-4 PM). Similar analysis may be made for each other team member, and the information within Table (1) is considered to provide its own description in view of the analysis above for the team member "Lisa." It is understood that the Table (1) may be rendered for a user as part of a graphical user interface on a display.

As described above, the information derived as described herein from electronic communications represents a new form of information derived by technical analysis of communication patterns of the respective team members. The electronic communications include instant messaging, teleconference communications, web-conference communications, electronic mail messaging, and other forms of electronic communications as appropriate for a given implementation.

Figure 3:
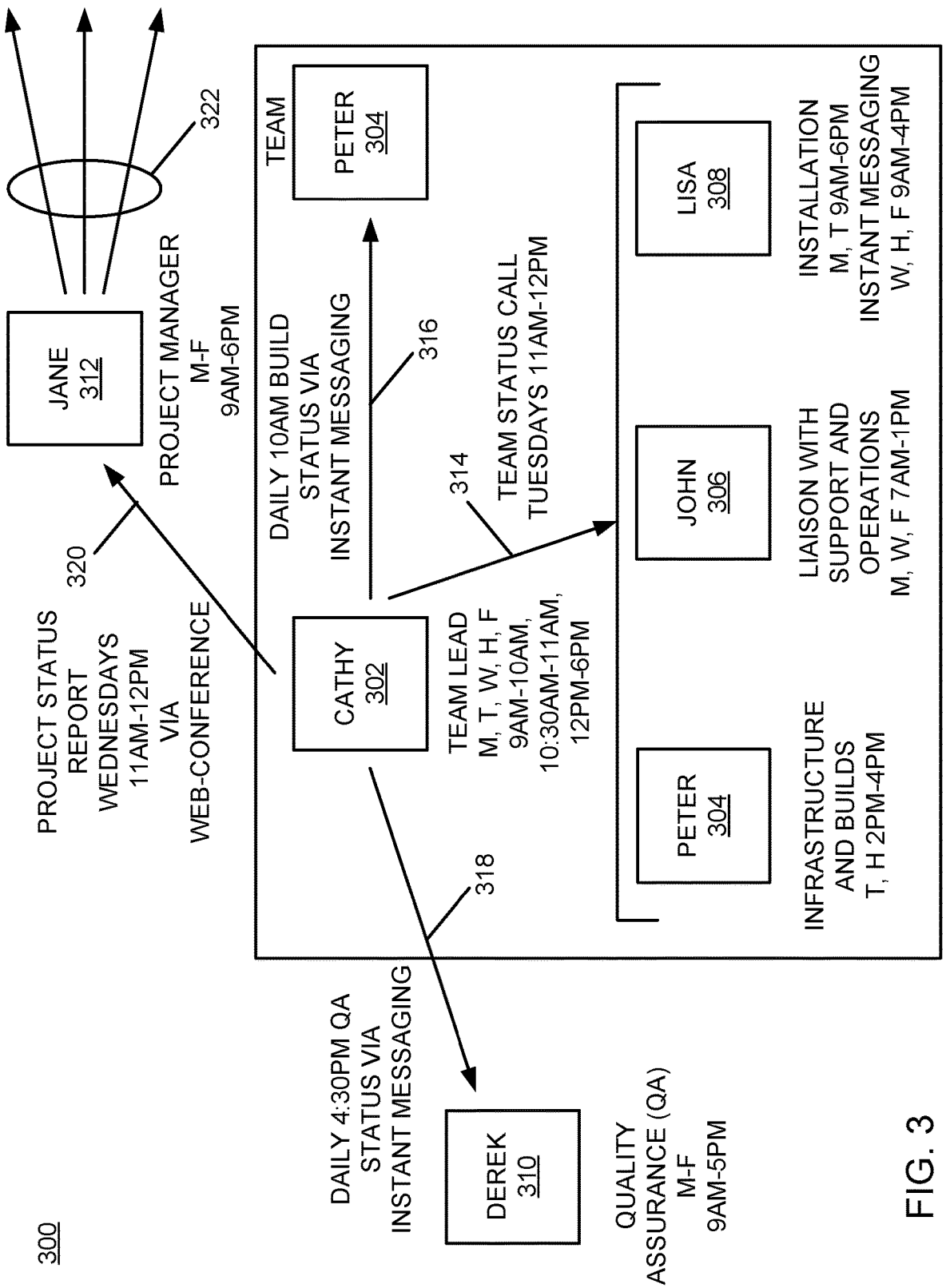
FIG. 3 is an illustration of an example of an implementation of a graphical user interface (GUI) for discovery and communication of team dynamics according to an embodiment of the present subject matter.

FIG. 3 is an illustration of an example of an implementation of a graphical user interface (GUI) 300 for discovery and communication of team dynamics. The GUI 300 may be rendered, for example, on the display 204 or other display as appropriate for a given implementation. To further the present example, the Table (1) is considered to be rendered on a display, such as the display 204. A user has selected a team member from the rendered Table (1), which in this example is the team member "Cathy." In response to the selection of the team member, the information about that team member and their relationships with other team members may be displayed as shown in the GUI 300. As such, the GUI 300 may be toggled into view on the display by selection of entries from Table (1). The user may further toggle back to the Table (1) using an appropriate input, as appropriate for a given implementation.

To reduce complexity within the drawing, pictures of the respective team members are not illustrated within the example. However, it is understood that photographs or other representations of the respective team members may be rendered on the user interface 300 as appropriate for a given implementation. As such, and again to reduce complexity within the drawing, the individual team members are shown and described as "representations" of the respective team members for purposes of illustration and description. Further, the information from Table (1) above is again illustrated in association with the respective representations of the respective team members. A separate redundant description of the various information elements is omitted for brevity and the description of Table (1) above is considered to describe the various text descriptions of available times and communication patterns of the respective team members.

As can be seen from FIG. 3, a representation 302 of the team lead "Cathy" is illustrated as the generally centered representation because Cathy is presumed within the present example to have been selected. As can be seen, Cathy has been determined by analysis of electronic communications to routinely interact with her team members as represented by a representation 304 of the team member "Peter," a representation 306 of the team member "John," and a representation 308 of the team member "Lisa." Other individuals noted within the Table (1) include a representation 310 of the quality assurance (QA) manager "Derek," and a representation 312 of the project manager "Jane."

The weekly (Tuesday) status call with the team is represented by an arrow 314 from the representation 302 of the team lead Cathy to the collective set of team members with its text description derived from the information within Table (1). Similarly, the daily status communication via text messaging with Peter is shown separately by an arrow 316 from the representation 302 of the team lead Cathy to a separate instance of the representation 304 of the team member Peter within FIG. 3. Additionally, the daily status communications for quality assurance via instant messaging is shown by an arrow 318 from the representation 302 of the team lead Cathy to the representation 310 of the quality assurance (QA) manager Derek. The weekly project status report via web-conference is shown by an arrow 320 from the representation 302 of the team lead Cathy to the representation 312 of the project manager Jane.

An additional group of arrows encapsulated by the ellipsis 322 shows that a user selection of the project manager Jane may be performed to switch the focus of the GUI 300 to Jane to see her additional routine electronic communication interactions. It should be further noted that to reduce complexity within the drawing, similar arrows for additional interactions of other persons, such as Derek, are not illustrated, though it is understood that similar navigation and traversal may be performed as appropriate for a given implementation to see additional routine electronic communication interactions of these other persons. Additionally, if any of the team members have routine electronic communication interactions with other teams or other persons, these routine electronic communication interactions may also be illustrated and navigated/traversed in a similar manner to move through an organization.

As such, the technology described herein provides a user a way to move through an organization and view routine patterns of electronic communication interactions to evaluate routine availability of users within the respective organization. Many other possibilities exist for user interface presentation of the information derived from electronic communication analysis described herein, and any such possibilities are considered within the scope of the present technology.

Figure 4:
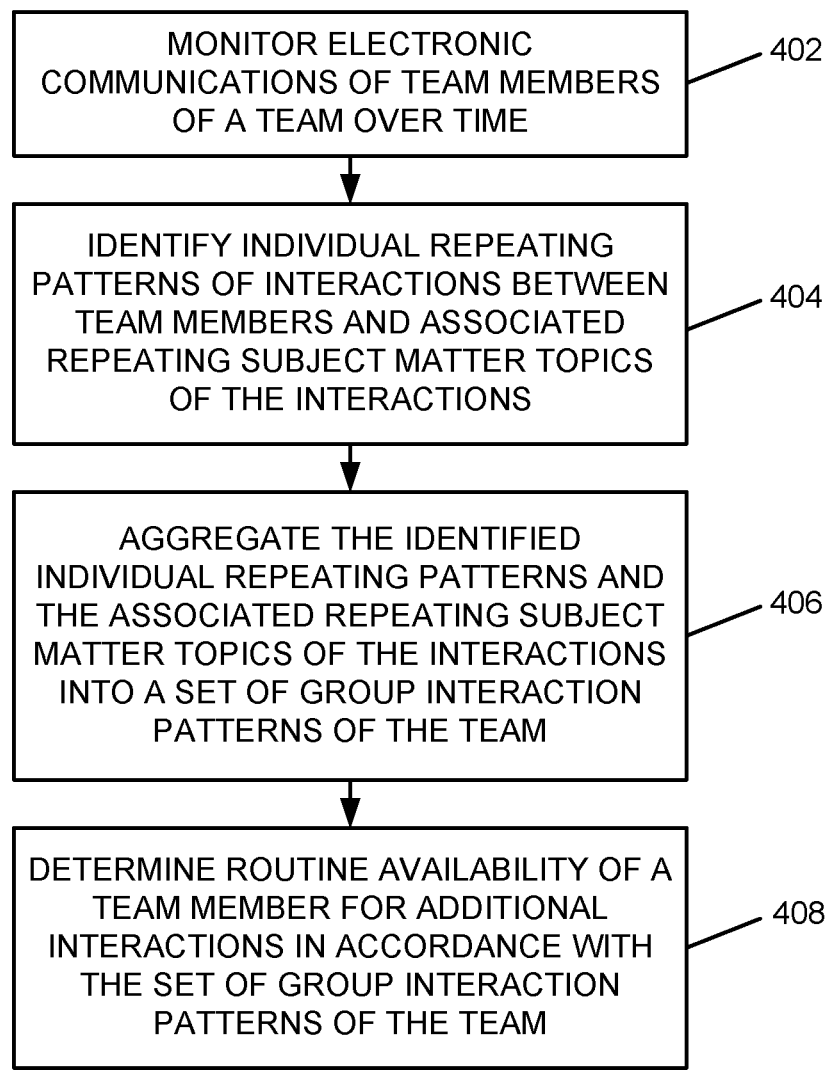
FIG. 4 is a flow chart of an example of an implementation of a process for discovery and communication of team dynamics according to an embodiment of the present subject matter.
Figure 5:
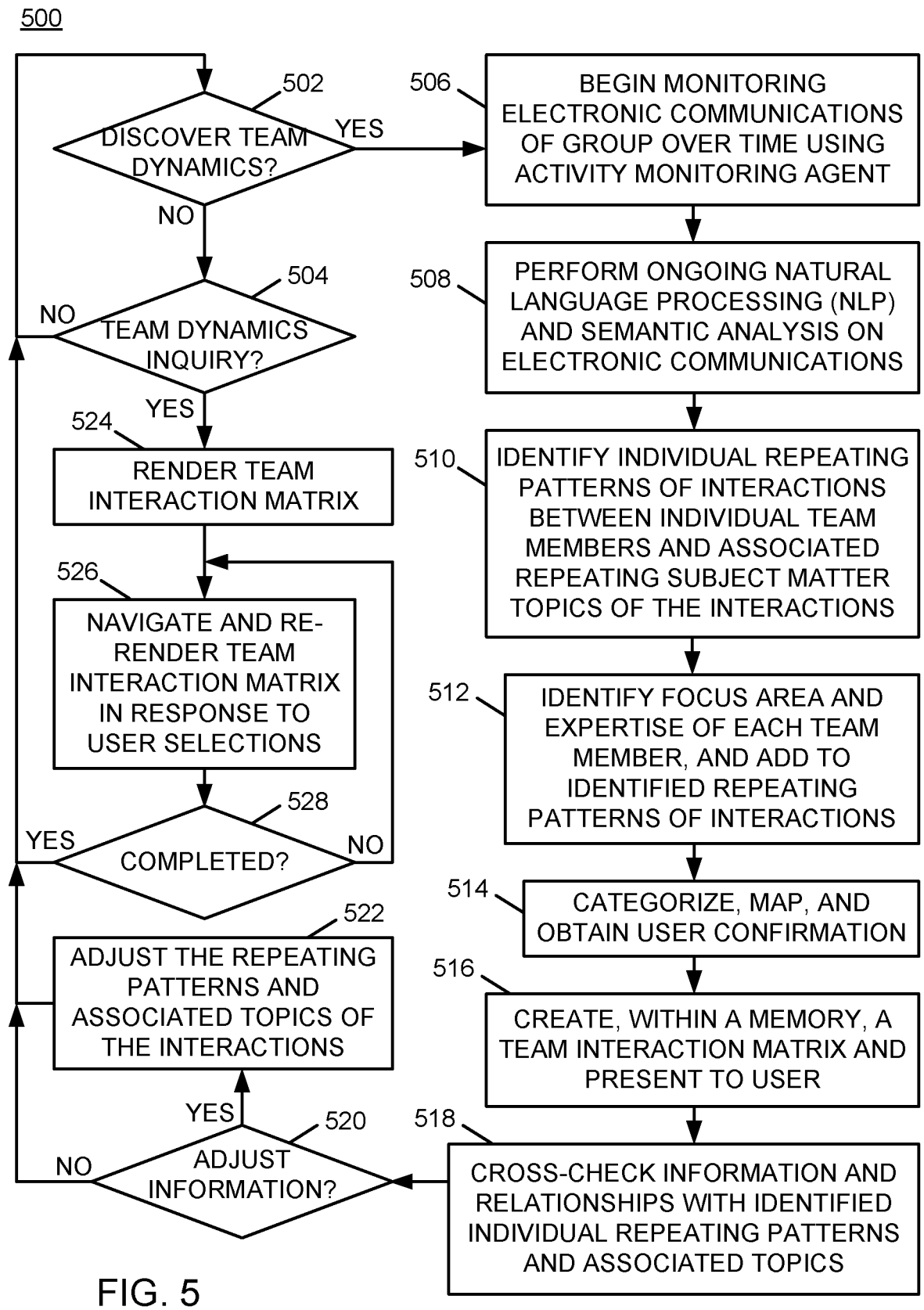
FIG. 5 is a flow chart of an example of an implementation of a process for discovery and communication of team dynamics that further provides for adjustment of derived group interaction information according to an embodiment of the present subject matter.

FIG. 4 through FIG. 5 described below represent example processes that may be executed by devices, such as the core processing module 200, to perform the automated discovery and communication of team dynamics associated with the present subject matter. Many other variations on the example processes are possible and all are considered within the scope of the present subject matter. The example processes may be performed by modules, such as the electronic communication monitoring and analysis module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for discovery and communication of team dynamics. The process 400 represents a computer-implemented method of performing the subject matter described herein. At block 402, the process 400 monitors electronic communications of team members of a team over time. At block 404, the process 400 identifies individual repeating patterns of interactions between team members and associated repeating subject matter topics of the interactions. At block 406, the process 400 aggregates the identified individual repeating patterns and the associated repeating subject matter topics of the interactions into a set of group interaction patterns of the team. At block 408, the process 400 determines routine availability of a team member for additional interactions in accordance with the set of group interaction patterns of the team.

FIG. 5 is a flow chart of an example of an implementation of a process 500 for discovery and communication of team dynamics that further provides for adjustment of derived group interaction information. The process 500 represents a computer-implemented method of performing the subject matter described herein. At decision point 502, the process 500 makes a determination as to whether an indication to discover team dynamics has been detected. For example, an indication to discover team dynamics may be detected in response to a startup of processing for an system, in response to a periodic configured time at which to discover team dynamics, or otherwise as appropriate for a given implementation. In response to determining that an indication to discover team dynamics has not been detected, the process 500 makes a determination at decision point 504 as to whether a team dynamics inquiry has been detected. A team dynamics inquiry may be initiated by a user, such as a new potential employee or other user that is interested in considering team dynamics in conjunction with an employment or other decision. In response to determining that a team dynamics inquiry has not been detected, the process 500 returns to decision point 502 and iterates as described above.

Returning to the description of decision point 502, in response to determining that an indication to discover team dynamics has been detected, the process 500 begins monitoring electronic communications of team members of a group over time using an activity monitoring agent installed on electronic communication devices of the team members at block 506. The group may include a project development team within an organization, departments within an organization, a recreational team affiliated with an extra-curricular organization, or other form of group as appropriate for a given implementation. The monitored electronic communications may include telephone calls, instant messaging, web conferences, teleconferences, emails, and other forms of electronic communications. The monitoring may include analysis of the timing of the various electronic communications.

At block 508, the process 500 performs an ongoing natural language processing (NLP) and semantic analysis on the monitored electronic communications. As such, the process 500 may use natural language processing (NLP) and semantic analysis to evaluate team member one-on-one electronic communications and electronically-conducted group interactions.

At block 510, the process 500 identifies individual repeating patterns of interactions between individual team members and associated repeating subject matter topics of the interactions. This processing to identify the respective repeating patterns may be performed using the NLP and semantic analysis described above.

At block 512, the process 500 identifies a focus area and an expertise of each team member, and adds the identified focus area and the expertise of each team member to each of the respective identified individual repeating patterns of the interactions. In addition to the discovered focus areas and expertise, to further enhance the team dynamics discovery, the process 500 may identify additional information about the team members, such as roles (e.g., management, project lead, etc.), timing of communications, communication type(s), communication style(s), connections with other team members, and other information that may be discovered through the analysis of the electronic communications. This information collectively represents captured group interaction patterns and additional information about the team.

At block 514, the process 500 categorizes, maps, and obtains user confirmation from the respective team members that the discovered subject matter topics, focus areas, expertise, and additional information about the respective team members are accurate. At block 516, the process 500 creates/constructs, within a memory (e.g., the memory 210), and presents to the user via a user interface (e.g., on a display such as the display 204) a team interaction matrix populated with the set of group interaction patterns of the team. Each group interaction pattern in the set may include identifiers of the respective team members, timing of the individual repeating patterns of the interactions between the individual team members, and the associated repeating subject matter topics of the interactions between the individual team members. Each group interaction pattern in the set may further include any additional information discovered about and confirmed by the respective team members as described above (e.g., focus areas, expertise, roles, etc.).

At block 518, the process 500 cross-checks information about the team members and relationships between the team members with the identified individual repeating patterns and the associated repeating subject matter topics of the interactions between the individual team members. As such, the process 500 further evaluates the group interaction patterns by internally cross-checking the discovered data, and may receive user input via the user interface regarding accuracy and any suggested adjustments.

At decision point 520, the process 500 determines, according to the cross-checking, whether to confirm or adjust the identified individual repeating patterns and the associated repeating subject matter topics of the interactions between the individual team members. In response to determining to adjust the identified individual repeating patterns and the associated repeating subject matter topics of the interactions between the individual team members in accordance with the cross-checking, the process 500 adjusts the identified individual repeating patterns and the associated repeating subject matter topics of the interactions between the individual team members in accordance with the cross-checking at block 522. In response to either adjusting the team interaction matrix information at block 522 or in response to confirming the information at decision point 520, the process 500 returns to decision point 502 and iterates as described above.

Returning to the description of decision point 504, in response to determining that a team dynamics inquiry has been detected, the process 500 renders the created team interaction matrix at block 524. The team interaction matrix may be rendered via a user interface as either a table, such as the Table (1) described above, or as a navigable GUI representation of the team interaction matrix, such as described in association with FIG. 3 above. Where a table representation of the team interaction matrix is rendered, the user may further be provided with an option to toggle between the table representation and the navigable GUI representation. For purposes of the description below, it is presumed that the user has either toggled to or been presented with the navigable GUI representation of the team interaction matrix.

As such, at block 526 the process 500 navigates and re-renders the team interaction matrix in response to user selections of team members within the rendered navigable GUI representation of the team interaction matrix. At decision point 528, the process 500 makes a determination as to whether an indication has been received that the user has completed viewing the team interaction matrix. In response to determining that an indication has been received that the user has not completed viewing the team interaction matrix, the process 500 returns to block 526 and iterates as described above. Alternatively, in response to determining that an indication has been received that the user has completed viewing the team interaction matrix, the process 500 returns to decision point 502 and iterates as described above.

As such, the process 500 provides complex information discovery from analysis of electronic communications of team members. The process 500 discovers team interaction dynamics and information about the team members that may assist other users (e.g., potential new employees or members of other teams) to more effectively interact with the team as a whole or with the individual team members. Users may navigate the graphically rendered navigable version of the team interaction matrix. It should be noted that other team interaction matrices may be created for other teams, and linkages between the respective team interaction matrices may be identified by discovering communication patterns between users that interact with multiple different teams. As such, navigation of any given team interaction matrix may lead the user to other team interaction matrices of other teams. This processing may continue throughout an organization or beyond an organization as appropriate for a given implementation.

As described above in association with FIG. 1 through FIG. 5, the example systems and processes provide discovery and communication of team dynamics. Many other variations and additional activities associated with discovery and communication of team dynamics are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method that improves real-time output of computer-derived usage patterns of remote distributed electronic devices, comprising:

iteratively monitoring, via communications among a collaborating set of distributed cross-platform activity monitoring agents respectively installed on different computing platforms of remote computers and smart devices used by team members of a team, usage activities of the respective different computing platforms by the team members and usage activity timing of the usage activities of the respective different computing platforms by the team members comprising: (i) inter-device electronic communications of multiple communication types transmitted between the respective remote computers and smart devices used by the team members comprising instant messaging communications, teleconference communications, web-conference communications, voice call communications, and electronic mail messaging communications, and (ii) application content and applications regularly used on the respective remote computers and smart devices by the team members;

iteratively deriving, by integrated processor-controlled collaborative inter-communication(s) and processing among the collaborating set of distributed cross-platform activity monitoring agents and a central team dynamics aggregation system, repeating patterns of interactions between the team members, which of the different computing platforms were used during the repeating patterns of interactions, time periods of the repeating patterns of interactions, the application content and applications regularly used on the respective remote computers and smart devices by the team members, and associated repeating subject matter topics of communication during the interactions based upon the monitored inter-device electronic communications and the application content of the applications regularly used;

collaboratively aggregating, in real time by the integrated processor-controlled collaborative inter-communication(s) and processing among the collaborating set of distributed cross-platform activity monitoring agents, at least a portion of the derived repeating patterns of interactions, the different computing platforms used during the repeating patterns of interactions, the time periods of the repeating patterns of interactions, the application content and applications regularly used on the respective remote computers and smart devices by the team members, and the associated repeating subject matter topics of communication during the interactions into a collaboratively machine-learned set of group interaction time-activity patterns of the team members; and iteratively adjusting in real-time and providing, as output, routine availability of a team member for additional interactions and at least a portion of the collaboratively machine-learned set of group interaction time-activity patterns of the team members.

2. The computer-implemented method of claim 1, where iteratively monitoring, via communications among the collaborating set of distributed cross-platform activity monitoring agents respectively installed on the different computing platforms of remote computers and smart devices used by the team members of the team, the usage activities of the respective different computing platforms by the team members and the usage activity timing of the usage activities of the respective different computing platforms by the team members comprising: (i) the inter-device electronic communications of multiple communication types transmitted between the respective remote computers and smart devices used by the team members comprising instant messaging communications, teleconference communications, web-conference communications, voice call communications, and electronic mail messaging communications, and (ii) the application content and applications regularly used on the respective remote computers and smart devices by the team members, comprises:

using natural language processing (NLP) and semantic analysis to evaluate the application content of the applications regularly used during periods of time of one-on-one team member electronic communications and the application content of the applications regularly used during periods of time of electronically-conducted team member group interactions.

3. The computer-implemented method of claim 1, where collaboratively aggregating, in real time by the integrated processor-controlled collaborative inter-communication(s) and processing among the collaborating set of distributed cross-platform activity monitoring agents, at least the portion of the derived repeating patterns of interactions, the different computing platforms used during the repeating patterns of interactions, the time periods of the repeating patterns of interactions, the application content and applications regularly used on the respective remote computers and smart devices by the team members, and the associated repeating subject matter topics of communication during the interactions into the collaboratively machine-learned set of group time-activity interaction patterns of the team members comprises:

constructing, by programmatic computer-based processing within a memory, a computer navigable team interaction matrix populated with the set of group time-activity interaction patterns of the team members, with each group time-activity interaction pattern in the set comprising identifiers of the respective team members involved in the repeating patterns of interactions, the different computing platforms used by the respective team members during the repeating patterns of interactions, the time periods of the repeating patterns of the interactions between the team members, the application content and applications regularly used on the respective remote computers and smart devices by the team members, and the associated repeating subject matter topics of communication during the interactions between the team members.

4. The computer-implemented method of claim 1, further comprising:

rendering a computer navigable team interaction matrix graphical user interface (GUI) populated with the collaboratively machine-learned set of group interaction time-activity patterns of the team members, where the computer navigable team interaction matrix GUI allows individual selection of team members; and iteratively, in response to sequential user selections of any team member or any contemporaneously-displayed associated other team member(s) within the computer navigable team interaction matrix GUI:

navigating within the collaboratively machine-learned set of group interaction time-activity patterns to the respective selected team members in the computer navigable team interaction matrix GUI; and displaying the determined routine availability of the respective selected team member in combination with displaying focused details of any of the set of group interaction time-activity patterns associated with the respective selected team member.

5. The computer-implemented method of claim 1, further comprising:

identifying a focus area and an expertise of each team member; and adding the identified focus area and the expertise of each team member to each respective derived repeating pattern of the interactions.

6. The computer-implemented method of claim 1, where iteratively adjusting in real-time and providing, as the output, the routine availability of a team member for additional interactions and the at least a portion of the collaboratively machine-learned set of group interaction time-activity patterns of the team members comprises:

cross-checking, in real time by the integrated processor-controlled collaborative inter-communication(s) and processing among the collaborating set of distributed cross-platform activity monitoring agents, information about the team members and relationships between the team members with the derived repeating patterns of interactions, the different computing platforms used during the repeating patterns of interactions, the time periods of the repeating patterns of interactions, the applications regularly used on the respective remote computers and smart devices by the team members, and the associated repeating subject matter topics of communication during the interactions between the team members; and one of confirming and adjusting the derived repeating patterns of interactions, the different computing platforms used during the repeating patterns of interactions, the time periods of the repeating patterns of interactions, the applications regularly used during the time periods of the repeating patterns of interactions, and the associated repeating subject matter topics of communication during the interactions between the team members in accordance with the cross-checking.

7. The computer-implemented method of claim 1, further comprising:

displaying a computer navigable team interaction matrix graphical user interface (GUI) that shows the collaboratively machine-learned set of group interaction time-activity patterns of the team members and allows navigation among the set of group interaction time-activity patterns of the team members; and iteratively, in response to sequential selections of any of the team members or any contemporaneously-displayed associated other team member(s) within the computer navigable team interaction matrix GUI:

(i) navigating within the computer navigable team interaction matrix GUI to the respective sequentially-selected team member;

(ii) displaying the time periods of the repeating patterns of interactions that involve the respective sequentially-selected team member;

(iii) displaying the applications regularly used during time periods of the repeating patterns of interactions that involve the respective sequentially-selected team member;

(iv) displaying the associated repeating subject matter topics of communication during the repeating patterns of interactions that involve the respective sequentially-selected team member;

(v) displaying the respective associated other team member(s) involved in the respective repeating patterns of interactions with the respective sequentially-selected team member;

(vi) displaying at least one of a focus area and an expertise of the respective associated other team member(s) involved in the respective repeating patterns of interactions with the respective sequentially-selected team member; and (vii) displaying the routine availability of the respective associated other team member(s) involved in the respective repeating patterns of interactions with the respective sequentially-selected team member.

\* \* \* \* \*